(No Model.)

E. P. WARNER.
COUPLING ROD CONNECTION.

No. 502,794.  Patented Aug. 8, 1893.

WITNESSES:
W. Clyde Jones.
George L. Cragg

INVENTOR
Ernest P. Warner.
By Barton & Brown
ATTYS (No Model.) 5 Sheets—Sheet 2.

E. P. WARNER.
COUPLING ROD CONNECTION.

No. 502,794. Patented Aug. 8, 1893.

Witnesses:
W. Clyde Jones.
George L. Cragg.

Inventor:
Ernest P. Warner
By Barton & Brown
Attys.

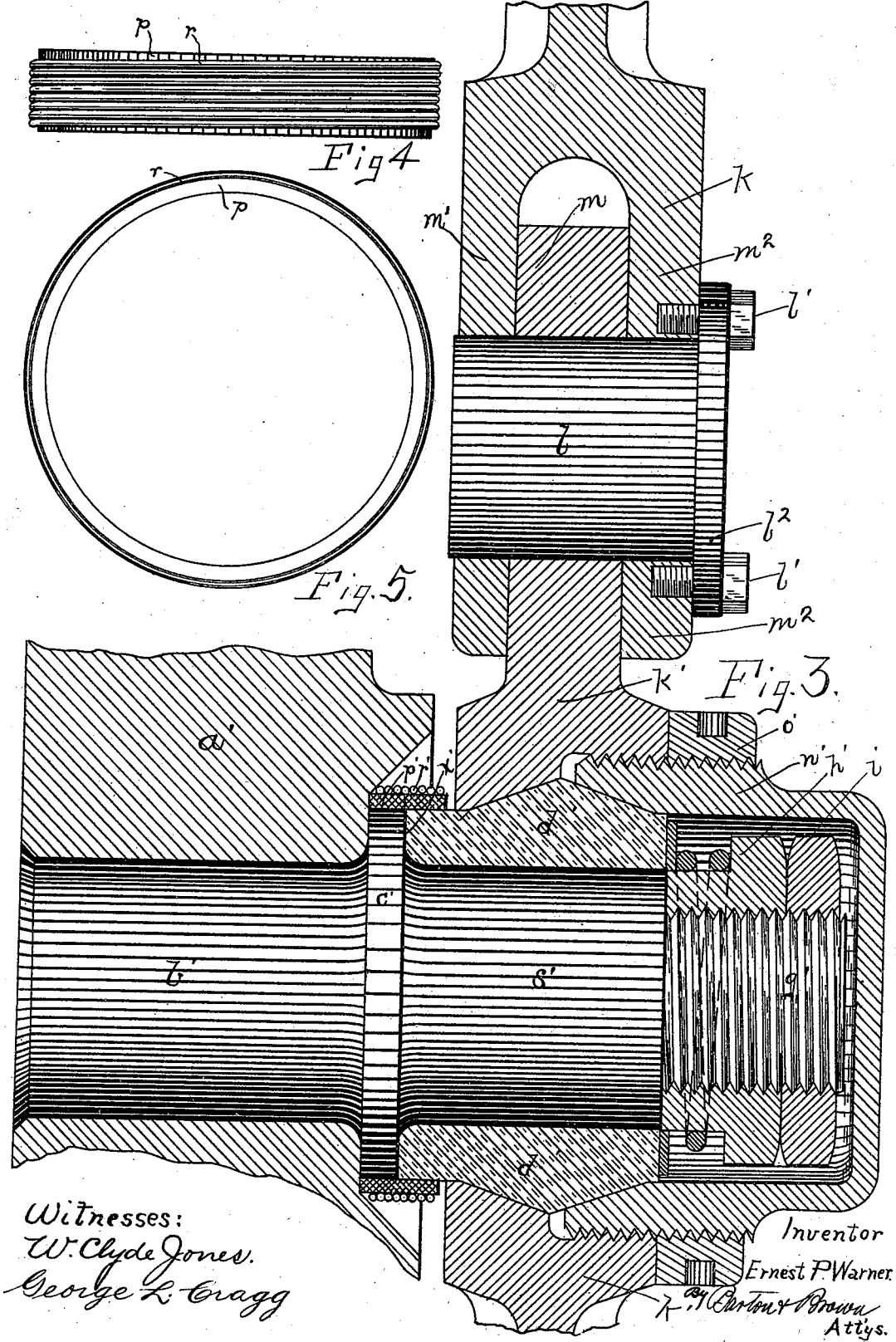

(No Model.) 5 Sheets—Sheet 4.
E. P. WARNER.
COUPLING ROD CONNECTION.

No. 502,794. Patented Aug. 8, 1893.

Witnesses:
W. Clyde Jones.
George L. Cragg.

Inventor:
Ernest P. Warner.
By Barton & Brown
Att'ys (No Model.) 5 Sheets—Sheet 5.
E. P. WARNER.
COUPLING ROD CONNECTION.
No. 502,794. Patented Aug. 8, 1893.
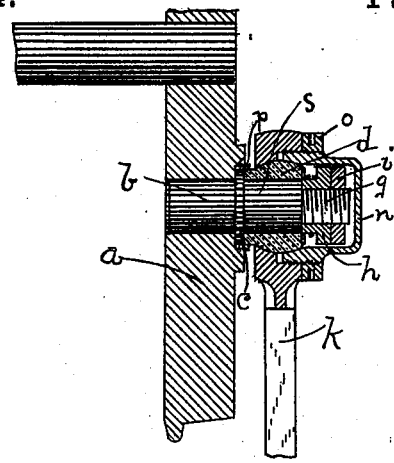
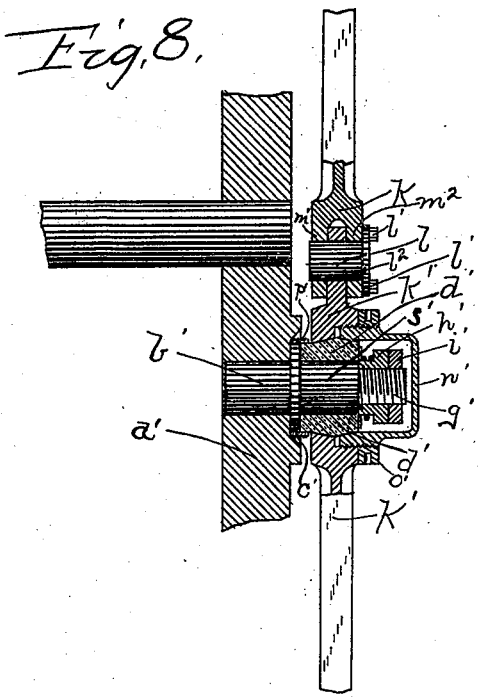
Fig. 8.
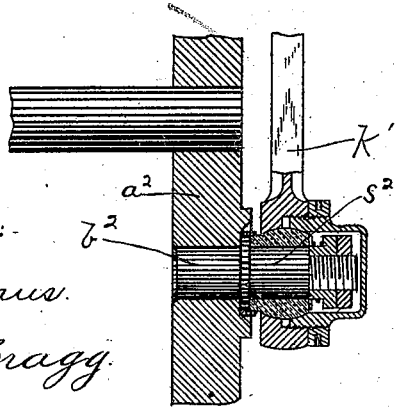
Witnesses:
W. Clyde Jones.
George L. Cragg.
Inventor:
Ernest P. Warner.
By Barton & Brown
Att'ys.

UNITED STATES PATENT OFFICE.

ERNEST P. WARNER, OF CHICAGO, ILLINOIS, ASSIGNOR TO THE WESTERN ELECTRIC COMPANY, OF SAME PLACE.

COUPLING-ROD CONNECTION.

SPECIFICATION forming part of Letters Patent No. 502,794, dated August 8, 1893.

Application filed June 21, 1892. Serial No. 437,506. (No model.)

*To all whom it may concern:*

Be it known that I, ERNEST P. WARNER, a citizen of the United States, residing at Chicago, in the county of Cook and State of Illinois, have invented a certain new and useful Improvement in Coupling-Rod Connections for Electric-Railway Motors, (Case No. 51,) of which the following is a full, clear, concise, and exact description, reference being had to the accompanying drawings, forming a part of this specification.

My invention relates to improvements in coupling rod connections for electric railway motors, and its object is to provide means for transmitting the rotary motion of the armature shaft to the wheel axles of the truck by means of an arrangement of coupling rods and crank pins that shall permit a slight throwing out of line of the wheel axles without causing an undue strain in the crank pins or coupling rods; with means provided for preventing the working of dust into the crank pin bearings.

Figure 1:
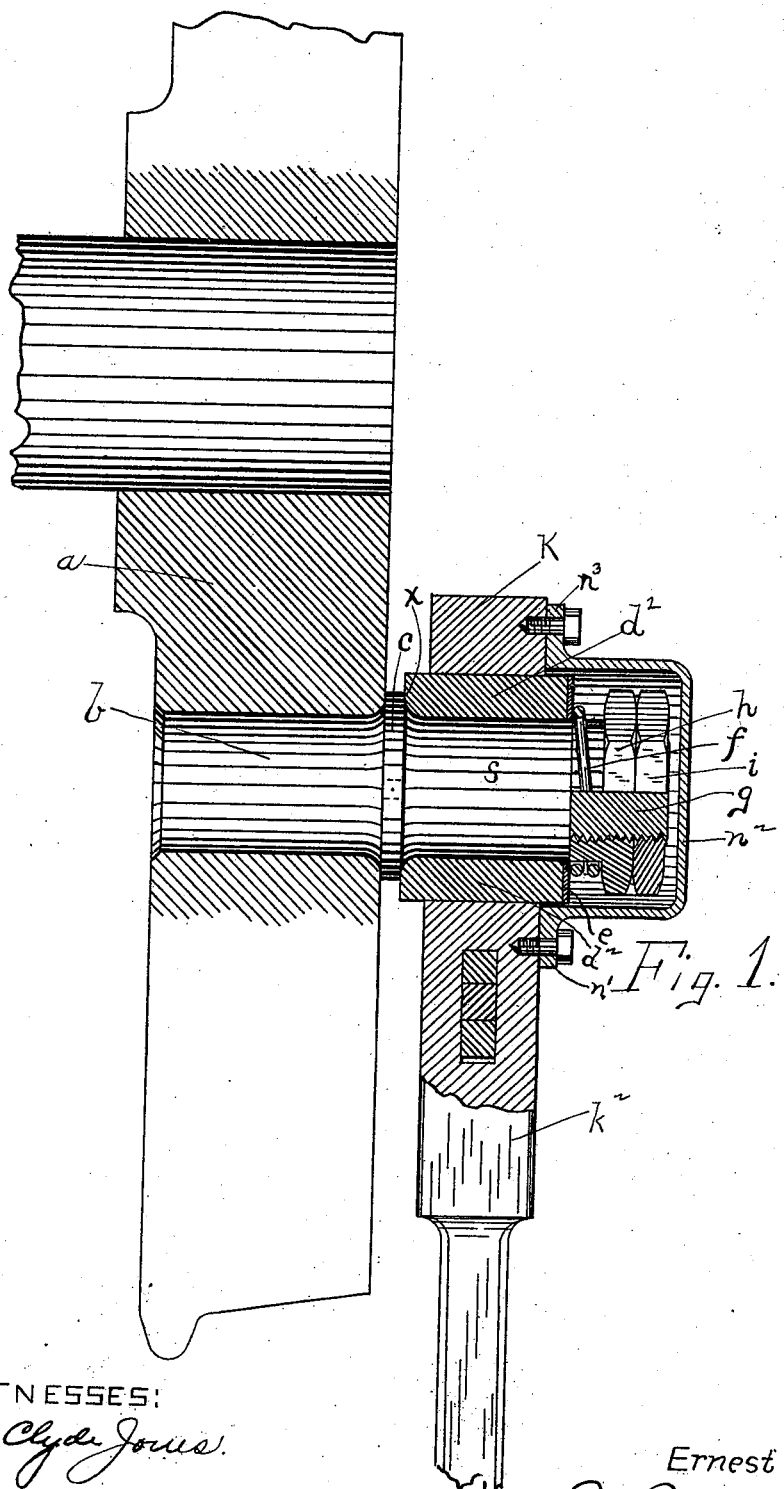
Figure 6:
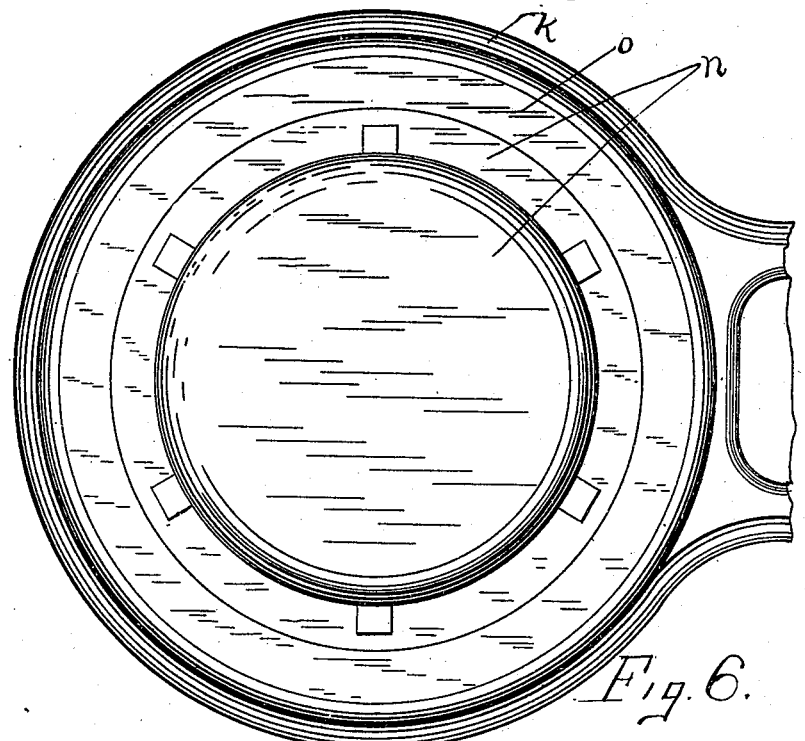
Figure 2:
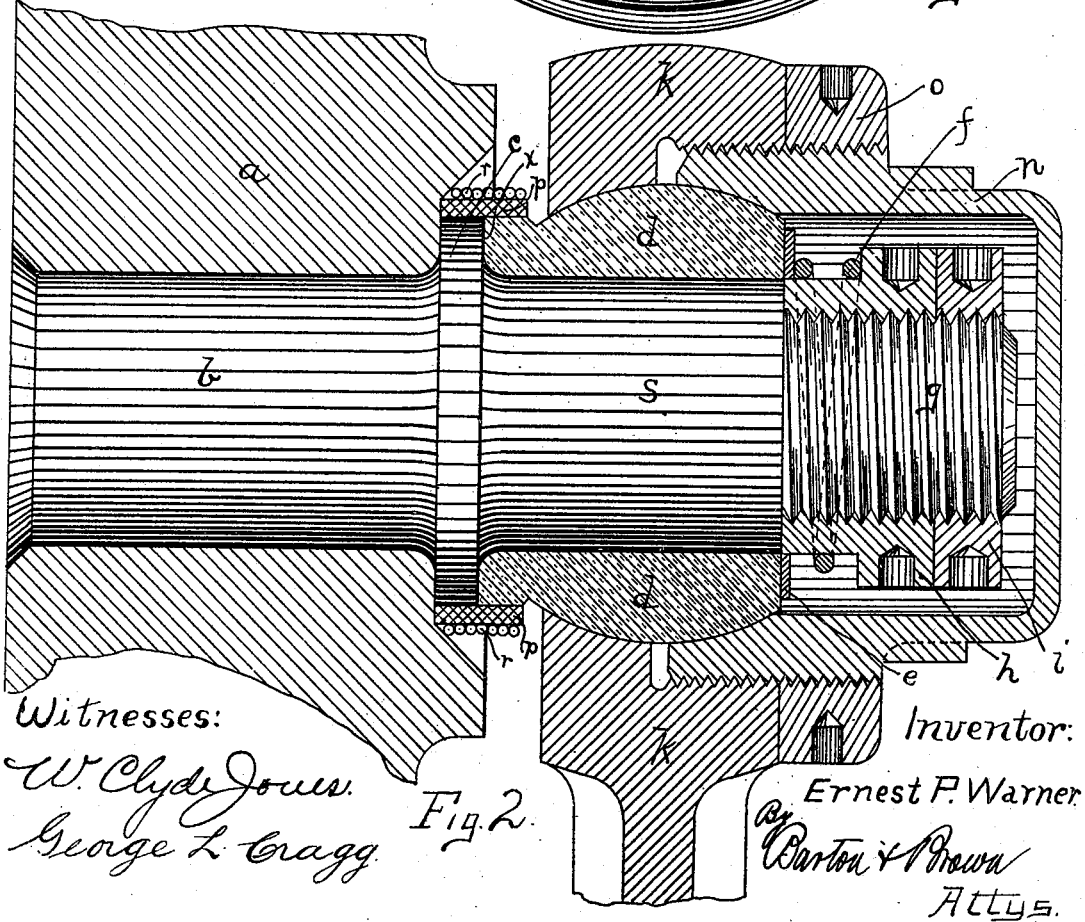
Figure 7:
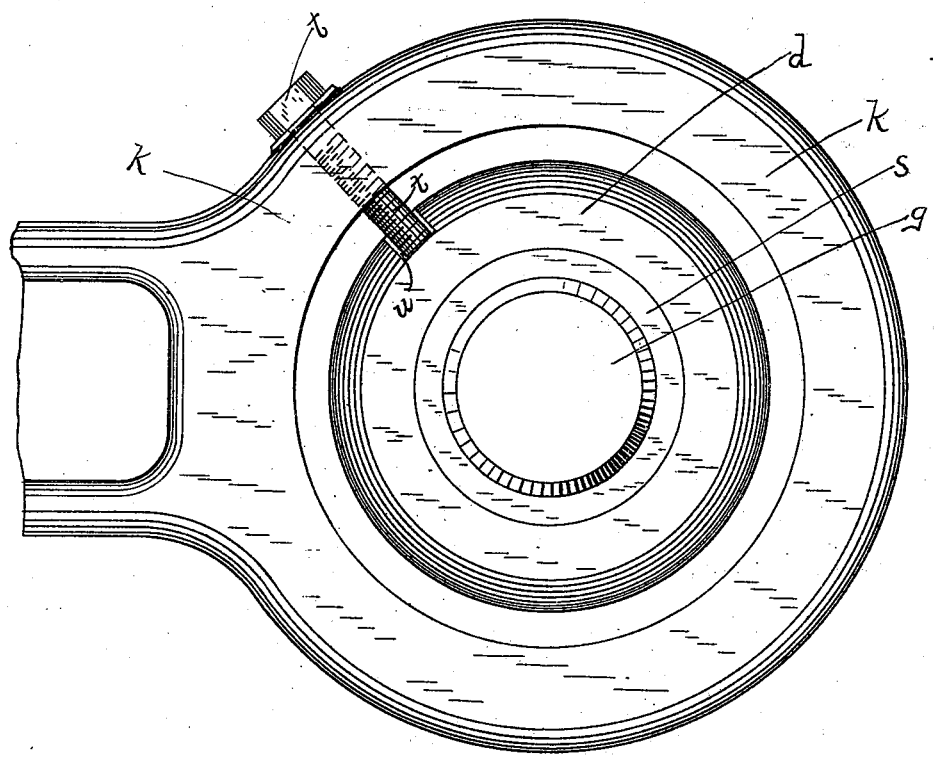

In the accompanying drawings,—Figure 1 is a sectional view of one of the car wheels taken through the center of the crank pin, showing the shape of the crank pin, the ordinary cylindrical brass, coupling rod, spring device for holding the brass against the collar of the crank pin, and the cap over the end of the crank pin. Fig. 2 is a sectional view through the center of one of the crank pins upon the car wheel showing the method of attachment of coupling rod to crank pin with means for preventing the working of dust into the crank pin bearing. Fig. 3 is a similar view, being a section through the center of the crank pin on the armature shaft disk showing the method of attachment of coupling rods to crank pin with means provided for preventing the working of dust into the crank pin bearing; and showing method of attaching the coupling rods. Figs. 4 and 5 are views of the leather band that prevents the working of dust into the crank pin bearing by means of the passage between the crank pin shoulder and the brass. Fig. 6 is a view of the crank pin cap looking toward the end of the crank pin. Fig. 7 is a view looking at the end of the crank pin in Fig. 2, the cap, spring, and nuts on the end of the crank pin being removed. Fig. 8 is a view of the connecting rods and the crank pins showing how the armature shaft disk is connected with the car wheels.

Like letters refer to like parts on the several figures.

Throughout the specification I have referred to the enlargement of the crank pin as a "collar," and to that portion of the enlargement or collar against which the brass is adapted to bear as a "shoulder."

The crank pin $b$ carries a collar $c$, as shown in Fig. 1; the rounded end of the brass $d^2$ in which the journal $s$ of the crank pin $b$ is adapted to turn, fits snugly against the fillet upon the shoulder $x$ of the crank pin, and said brass $d^2$ being held by means of a spring device against the shoulder prevents any working in of dust, but permits the oil on the crank pin bearing to work out by centrifugal force, and thus keep the bearing between the end of the brass and the shoulder of the crank pin well lubricated. To press the brass $d^2$ against the shoulder $x$ a thread is cut on the end $g$ of the crank pin, said end $g$ projecting beyond the coupling rod; a spring $f$ encircles this threaded projection and bears against the washer $e$, prefferably of steel, provided upon the end of the brass $d$; a nut $h$ is screwed upon the end $g$ of the crank pin and against the end of the spring $f$, which spring reacts against the nut $h$ to press the brass $d$ against the shoulder $x$ of the crank pin $b$. A check nut $i$ is screwed against the nut $h$ to prevent the latter from turning. The brass $d^2$ is held in the coupling rod in the usual manner by means of strap, gibs, and key. A cap $n^2$ is fitted over the end of the crank pin and held in position by the flange $n^3$ being screwed against the coupling rod.

The above is a description of the application of the arrangement for excluding dust from the crank pin bearing as applied to an ordinary crank pin connection.

To permit lateral movement of the coupling rod relatively to the crank pin upon one of the car wheels and to exclude dust from the crank pin bearing, the improved arrangement as shown in Fig. 2 is used. The crank pin $b$, as in the former case, is made with a collar $c$, which collar $c$ is set into the wheel a short distance, a portion of the wheel being cut away as shown, to admit the collar $c$ so as to admit of placing the leather band $p$ over the collar $c$ and a portion of the brass without bringing the coupling rod too far from the wheel. Against the shoulder $x$ of the crank pin, the end of the brass $d$ is pressed by the spring $f$, acting between the steel washer $e$, placed against the end of the brass, and the nut $h$, in the manner heretofore described.

The coupling rod $k$ is bored spherically to receive the spherical brass $d$; the end of the cap $n$ is also bored spherically. The cap $n$ is adapted to screw into the coupling rod, and, on being screwed into the same, the brass $d$ is held between the spherical surfaces upon the coupling rod and the cap, and permits free motion of the coupling rod relatively to the brass in all directions save that in the plane of propulsion. Motion in the plane of propulsion is prevented by the set screw $t$ whose end projects into the slot $u$ cut in the brass $d$, which slot is parallel to the axis of the crank pin. A check nut $o$ is adapted to screw upon the cap $n$ and against the connecting rod and holds the cap in position after it has been adjusted. By this arrangement, if for any cause the axis of the crank pin $b$, upon the car wheel is thrown out of parallel with the axis of the crank pin $b'$, upon the armature disk $a'$, the coupling rod $k$ will accommodate itself to the disalignment by shifting its bearing upon the brass $d$. By this arrangement all dust is excluded from the crank pin bearing that would, without such provision, work into the bearing from the exposed end of the crank pin. This arrangement also permits of adjusting the coupling rod upon the brass to take up wear.

To prevent dust from working into the crank pin bearings at the shoulder a portion of the brass $d$ is turned to the same diameter as the collar of the crank pin. Over this portion of the brass $d$ and the collar $c$ of the crank pin, a flexible band $p$, preferably of leather, is adapted to fit and wound around with wire $r$ to press the same against the surfaces of the brass and of the collar upon the crank pin. In this manner all dust is prevented from working into the crank pin bearing or between the brass and shoulder of the crank pin, but oil is permitted to work by centrifugal force between the end of the brass and the shoulder of the crank pin. Thus by means of a cap over the outer end of the crank pin and a band covering the collar of the crank pin and the portion of the brass next to the shoulder, the crank pin bearing is sealed against the entrance of dust or other foreign material.

The connection between the coupling rod $k'$ and the crank pin carried upon the armature shaft disk $a'$ is substantially the same as the connection between the coupling rods and the crank pins upon the car wheels with the exception of the outer surface of the brass $d'$ and the surfaces of the coupling rod and the cap with which the same is in contact. As shown in Fig. 3 the outer surface of the brass $d'$ is in the shape of the surfaces of two frustums of cones placed base to base. Upon one side a corresponding surface of the coupling rod is adapted to bear, and, upon the other, a corresponding surface upon the end of the cap $n'$. The screwing of the cap $n'$ into the coupling rod holds the brass $d'$ between the coupling rod and the cap, but the construction of the brass prevents the axis of the coupling rod from moving out of a perpendicular to the axis of the crank pin. The brass is prevented from moving in the plane of propulsion by a set screw fitting a slot in the brass, as before described. The method of securing the brass in position by clamping it between the coupling rod and the cap is applicable to other forms of brasses than those whose outer surfaces are spherical, or that of two frustums of cones placed base to base, the essential feature being that the outer surface of the brass should be non-cylindrical and the surfaces of the coupling rod and of the cap correspond therewith. This arrangement of the brasses holds the axes of the coupling rods always perpendicular to the axis of the crank pin, $b'$ and, consequently, to the armature shaft, but permits the axes of the crank pins upon the car wheels to vary from a perpendicular position to the axes of the coupling rods, thus allowing for the throwing out of line of the axes of the car wheel crank pins by slight elevations and depressions in the railway track, by difference in level of the rails, by the turning of curves, &c.

The coupling rods $k$ and $k'$ are connected together in the following manner. One of the coupling rods $k'$, see Fig. 3, is provided with a tongue $m$. The other coupling rod $k$ is provided with a forked end whose members $m'$ $m^2$ are adapted to fit over the tongue $m$, on rod $k'$, bearing surfaces being provided between the tongue $m$ and the forked members $m'$ $m^2$. In a hole passing through said tongue and forked members, a connecting pin $l$ is adapted to bear. Said pin $l$ is provided with a flange $l^2$ by which said pin $l$ may be fastened to the outer forked member $m^2$ by means of bolts $l'$ $l'$, passing through the flange of said pin $l$. Thus a connection between the two coupling rods is made in a manner such that the rods may be readily disconnected, working from the front of the same, and doing away with the necessity of working at the back of the coupling rods, or removing them entirely from the crank pin. By thus using two coupling rods insead of one, means are provided for permitting the center of one of the car wheel crank pins to move out of the line connecting the centers of the other car wheel crank pin and the crank pin upon the armature shaft disk, such a disalignment occurring when one wheel encounters a slight elevation or depression in the track.

By the above described combinations and arrangements the power from the armature shaft, situated between the car wheel axles, may be transmitted directly to the wheels of a car truck by means of coupling rods connecting the crank pin upon the armature shaft disk and the crank pins upon the car wheels. Means are provided for permitting the axis of the crank pin of one car wheel to move out of the line joining the axis of the crank pin, upon the other car wheel, and the axis of the crank pin, upon the armature shaft disk; and means for permitting the axes of the crank pins upon the car wheels to move out of a perpendicular with the axes of the coupling rods, which axes of the coupling rods are always held perpendicular to the crank pin upon the armature shaft disk, and, consequently, to the armature shaft. Means are provided for excluding the dust and other foreign material from the crank pin bearings.

Having described my invention, what I claim as new, and wish to have secured by Letters Patent, is—

1. The combination with the crank pin provided with a filleted shoulder, of a brass in which the crank pin is adapted to bear provided with a rounded end adapted to bear against said filleted shoulder, said crank pin being also provided with a threaded projection upon its end, a spring encircling said projection, a washer upon the end of said brass, a nut screwed upon said threaded projection, between which washer and nut said spring is adapted to act to press the brass against the shoulder of the crank pin, the check nut screwed upon said threaded projection, the cap attached to the coupling rod and incasing the end of the crank pin, substantially as described.

2. The combination with a crank pin provided with a shoulder, of a brass whose end is adapted to bear against said shoulder; a spring adapted to bear against said brass and press the same against said shoulder by its reaction upon a nut screwing upon the end of the crank pin, said nut, and a cap adapted to incase the end of the crank pin, substantially as described.

3. The combination with a crank pin provided with a shoulder, of a brass adapted to bear against said shoulder; a spring encircling a threaded projection upon the end of said crank pin and adapted to hold said brass against said shoulder by its reaction upon a nut screwed upon said projection; and said nut, substantially as described.

4. The combination with a crank pin provided with a shoulder, of a brass adapted to bear against said shoulder, and means provided for pressing said brass against said shoulder with yielding pressure, substantially as described.

5. The combination with a crank pin provided with a collar, of a brass adapted to bear against the shoulder of said collar, the portion of said brass adjacent to said collar being of the same diameter as the collar said brasses being provided with a convex outer surface; a strap fitting over said portion and said collar, a coupling rod and a cap, each provided with corresponding concave surfaces between which said brass is adapted to be held; a check nut for holding said cap in position; a nut screwing upon a threaded projection provided upon the end of said crank pin; a check nut adapted to hold said nut in position; a spring adapted to react upon said nut and press said brass against the shoulder upon the crank pin, and a washer between said brass and said spring, substantially as described.

6. The combination with a brass whose outer surface is non-cylindrical, of a coupling rod and a cap provided with corresponding surfaces between which said brass is adapted to be held whereby the coupling rod is held in position and the end of the crank pin is protected from the entrance of foreign substances, substantially as described.

7. The combination with a crank pin provided with a shoulder, of a brass adapted to be yieldingly pressed against said shoulder, said brass being provided with a non-cylindrical outer surface; a coupling rod and a cap, each provided with corresponding surfaces and adapted to hold said brass between said surfaces, substantially as described.

8. The combination with a crank pin provided with a collar, of a brass adapted to bear against the shoulder of said collar, a portion of said brass adjacent to said collar being of the same diameter as the collar; said brass being provided with a spherical outer surface, a strap fitting over said portion and said collar, a coupling rod and a cap, each provided with corresponding spherical surfaces and adapted to hold said brass in position; a check nut for holding said cap in position; a nut screwing upon a threaded projection provided upon the end of said crank pin; a check nut adapted to hold said nut in position; a spring adapted to react upon said nut and press said brass against the shoulder upon said crank pin, and a washer between said brass and said spring, substantially as described.

9. The combination with a brass whose outer surface is spherical, of a coupling rod and a cap provided with corresponding spherical surfaces between which said brass is adapted to be held whereby the coupling rod is held in position and the end of the crank pin is protected from the entrance of foreign substances, substantially as described.

10. The combination with a crank pin provided with a shoulder, of a brass adapted to be yieldingly pressed against said shoulder, said brass being provided with a spherical outer surface; a coupling rod and a cap each provided with corresponding spherical surfaces and adapted to hold said brass between said surfaces, substantially as described.

11. The combination with a crank pin provided with a collar, of a brass the end of which is of the same diameter as the collar upon the crank pin; a band adapted to encircle and bear upon said collar and said brass, substantially as described.

12. The combination with a coupling rod provided with a bifurcated end, of a coupling rod provided upon its end with a tongue, said tongue adapted to fit between the members of said bifurcation; a pin passing through the members and the tongue, said pin being attached to the member of the fork by screws passing through a flange provided upon the end of said pin, substantially as described.

13. The combination with the crank pin $s'$, of the coupling rod $k'$ attached thereto in the manner described by the brass $d'$ whose outer surface is that of two frustums of cones placed base to base, thus holding the axes of the coupling rods always perpendicular to the axis of the crank pin; said brass $d'$; the crank pin $b^2$ upon the wheel $a^2$ attached to the other end of the coupling rod $k'$ by the spherical brass in the manner described; said spherical brass; the coupling rod $k$ attached to the coupling rod $k'$ by the forked members $m'$ $m^2$ and tongue $m$ and flange pin $l$; the crank pin $b$ upon the wheel $a$ attached to the coupling rod $k$ by the spherical brass $d$, and said brass $d$, substantially as described.

14. The combination with a crank pin upon the armature shaft disk, of a brass whose outer surface is that of two frustums of cones placed base to base; a coupling rod connected with said brass; a crank pin upon one of the wheels; a spherical brass in which said crank pin is adapted to bear, said brass being attached to the other end of said coupling rod; a crank pin upon the other car wheel upon the same side of the truck; a spherical brass in which said crank pin is adapted to bear; a coupling rod attached to said brass and a pivotal connection between the ends of said coupling rods, substantially as described.

In witness whereof I hereunto subscribe my name this 11th day of May, A. D. 1892.

ERNEST P. WARNER.

Witnesses:
W. CLYDE JONES,
M. JEANE TALLETT.